United States Patent
Fowler et al.

(10) Patent No.: US 11,162,644 B2
(45) Date of Patent: Nov. 2, 2021

(54) METHOD OF COUPLING AUTOMOTIVE EXTERIOR LIGHT BARS

(71) Applicants: Nicholas Fowler, Deering, NH (US); Christopher Apkarian, Hooksett, NH (US)

(72) Inventors: Nicholas Fowler, Deering, NH (US); Christopher Apkarian, Hooksett, NH (US)

(73) Assignee: OSRAM SYLVANIA Inc., Wilmington, MA (US)

(*) Notice: Subject to any disclaimer, the term of this patent is extended or adjusted under 35 U.S.C. 154(b) by 83 days.

(21) Appl. No.: 16/584,633

(22) Filed: Sep. 26, 2019

(65) Prior Publication Data
US 2021/0018165 A1   Jan. 21, 2021

Related U.S. Application Data

(60) Provisional application No. 62/876,504, filed on Jul. 19, 2019.

(51) Int. Cl.
*F21V 19/00* (2006.01)
*F21V 17/10* (2006.01)
(Continued)

(52) U.S. Cl.
CPC .............. *F21K 9/20* (2016.08); *B62D 65/16* (2013.01); *F21S 4/28* (2016.01); *F21V 15/015* (2013.01); *F21V 17/10* (2013.01); *F21V 19/003* (2013.01); *F21V 21/005* (2013.01); *B60Q 1/18* (2013.01); *F21W 2102/00* (2018.01); *F21W 2107/10* (2018.01); *F21Y 2103/00* (2013.01); *F21Y 2115/10* (2016.08)

(58) Field of Classification Search
CPC ... F21K 9/20; B62D 65/16; F21S 4/28; F21V 21/005; F21V 19/003; F21V 17/10; F21V 15/015; F21W 2102/00; F21W 2107/10; B60Q 1/18; B60Q 1/2611; B60Q 1/0483; F21Y 2103/00; F21Y 2115/10
See application file for complete search history.

(56) References Cited

U.S. PATENT DOCUMENTS 6,796,680 B1   9/2004  Showers et al.
7,549,784 B1*  6/2009  Teeters ................... F21V 23/06
                                                  362/145
(Continued)

OTHER PUBLICATIONS

Applicants' co-filed, pending U.S. Appl. No. 16/584,590, filed Sep. 26, 2019.

*Primary Examiner* — David P Bryant
*Assistant Examiner* — Darrell C Ford
(74) *Attorney, Agent, or Firm* — Edward Podszus

(57) ABSTRACT

First adapter (10) and second adapter (40) are each separately securable to a respective automotive light bar (200, 201) at mutually facing lateral light bar end caps (206). The adapters (10, 40) interfit, such as first adapter (10) having one or more tenons (14; 18) received in shape-conforming recess or mortise (44) of second adapter (40). The coupling assembly formed from interfit first and second adapters (10, 40) sufficiently supports a midspan region of conjoined light bars (200, 201) to permit omission of mounting L-brackets (208) conventionally required at the mutually facing light bar ends (206), thus allowing fewer holes to be drilled in vehicle roof or bumper (212) and resulting in an aesthetically cleaner presentation of the overall lengthened light bar assembly.

19 Claims, 20 Drawing Sheets

(51) Int. Cl.
*B62D 65/16* (2006.01)
*F21W 107/10* (2018.01)
*F21K 9/20* (2016.01)
*F21S 4/28* (2016.01)
*F21V 21/005* (2006.01)
*F21V 15/015* (2006.01)
*F21Y 115/10* (2016.01)
*F21W 102/00* (2018.01)
*B60Q 1/18* (2006.01)
*F21Y 103/00* (2016.01)

(56) References Cited

U.S. PATENT DOCUMENTS

| | | | |
|---|---|---|---|
| 8,262,250 B2 * | 9/2012 | Li | F21V 23/06 362/219 |
| 8,764,220 B2 | 7/2014 | Chan et al. | |
| 9,279,544 B1 | 3/2016 | Dankelmann et al. | |
| 9,537,274 B1 | 1/2017 | Dankelmann et al. | |
| 9,599,321 B2 | 3/2017 | Sorensen et al. | |
| 2003/0001113 A1 * | 1/2003 | Witham | A61L 2/10 250/504 R |
| 2006/0273121 A1 * | 12/2006 | Thomas | B60R 9/058 224/322 |
| 2009/0147504 A1 * | 6/2009 | Teeters | H01R 31/02 362/153 |
| 2009/0161377 A1 | 6/2009 | Helms et al. | |
| 2014/0334142 A1 * | 11/2014 | Levante | F21V 23/06 362/222 |
| 2014/0362574 A1 * | 12/2014 | Barrett | F21S 4/28 362/249.03 |
| 2016/0290571 A1 | 10/2016 | Chamberlain | |
| 2019/0353313 A1 * | 11/2019 | Chamberlain | F21V 29/61 |
| 2020/0191338 A1 * | 6/2020 | Yamazaki | F21S 8/06 |
| 2021/0018145 A1 | 1/2021 | Apkarian et al. | |

* cited by examiner

METHOD OF COUPLING AUTOMOTIVE EXTERIOR LIGHT BARS

CROSS REFERENCE TO RELATED APPLICATIONS

This application claims priority from United States provisional application Ser. 62/876,504, whose contents are hereby incorporated by reference as if fully set forth herein.

STATEMENT REGARDING FEDERALLY SPONSORED RESEARCH OR DEVELOPMENT

N/A

TECHNICAL FIELD

The present application relates to automotive exterior lighting such as lamps or light bars, particularly to interfitting adapters to couple a plurality, such as two or more, light bars.

BACKGROUND

Light bars are known for mounting on exterior surfaces of an automobile, and marketed in the United States by Sylvania as an "off-road light bar" in the vehicle aftermarket such as those commercially available designated a "10-inch S-Series LED Lightbar" or a "20-inch S-Series LED Lightbar", referring to the nominal approximate overall longest dimension, length along its longitudinal axis, of the light-emitting surface. Such light bars are commonly used as off-road, auxiliary lighting to enhance illumination in remote locations, or to enhance vehicle aesthetic appearance for display. They generate considerable light, e.g. a 10-inch light bar operates at about 3 Amp at 12 Volt, and a 20-inch light bar operates at about 6 Amp at 12 V.

A user may wish to have a longer light bar, such as to span a width of a vehicle roof or bumper. A nominal 10-inch light bar 200, 201 has an overall length of about 12.2 inch (ca. 310 mm), and an analogous nominal 20-inch light bar has an overall length of about 22.2 inch (ca. 565 mm). A consumer may wish to mount a 10-inch light bar adjacent a 20-inch light bar in line end-to-end, or a user already having a 10-in. light bar may wish to purchase an additional 10-in. light bar so as to approximate a 20-in. unit without having to discard the existing 10-in. unit. Other combinations may be desired, including three or more such light bars. When so mounted adjacent one another at their lateral ends, a user may wish to have two 10-inch light bars approximate the styling of a unitary, longer light bar (such as a manufactured "20-inch Lightbar", with fewer visible gaps or interruptions between light bars that are mounted on separate L-brackets no matter how close they are brought together. Inventors herein recognized that users may also prefer the stylistic appearance of a continuous light bar and the practical convenience of drilling fewer holes in a vehicle roof or bumper to mount the L-brackets. Inventors herein also recognized the disadvantages of prior light bar arrangements and the desire for compact, or weight-saving, or more lightweight mounting, and more stylish, aesthetically appealing design for mounting multiple light bars, preferably in line end-to-end.

ACKNOWLEDGED PRIOR ART

FIG. 27 and FIG. 28 illustrate a conventional light bar 200 (or light bar 201 in FIG. 29), which in the 10-inch light bar version weighs about 4 pounds (1.8 kg), and is supplied with mounting hardware such as 0.18-inch (4.8 mm) stainless steel universal L-brackets 208 and stainless steel mounting hardware, such as hex-socket headed metric-sized M6×14 mm bolts 218, with two bolts 218 to connect each bracket 208 at each lateral end of light bar 200, and one bolt (not shown) to connect bracket 208 to vehicle roof or bumper 212. Electrical power from the vehicle is supplied to light bar 200 through power cable 210. Conventional light bars are equipped with solid-state lighting, such as light-emitting diodes (LEDs) accommodated at light-emitting region 204 in housing 202. Housing 202 is preferably made from aluminum to act as a heat-sink for the LEDs. The hollow cavity of housing 202 is closed off at each lateral end by an end cap 206. Screws 214 secure end cap 206 to housing 202 front face to help secure a lens defining light emission region 204 to housing 202.

Referring to FIG. 28, end cap 206 is shown with the surface, that in conventional mounted position would be closest to roof 212, facing upwards. End cap 206 is secured laterally to housing 202 by screws at screw holes 224, four being shown. A bolt 220, e.g. of size M6×0.75, attaches to end cap 206 at the end shown, corresponding to the right-hand end of FIG. 27; at the opposite, left-end of FIG. 27, an end cap 206 is provided, at the analogous location as depicted for bolt 220, with a rubber grommet that accommodates electrical cable 210 having a pigtail electrical connector (not shown) at its distal terminus. At a lateral end of light bar 200 where there is no power cable 210, bolt 220 occupies the hole in end cap 206. End cap 206 has two bosses 226 forming threaded holes 216, which are of height chosen to be coplanar so as to define a generally planar mounting surface for the inner face of L-bracket 208 to abut end cap 206. Bosses 226 surround bolt holes 216 with a slightly protruding lip, upstanding in the outward lateral direction. Bosses 226 with bolt holes 216 are sized to receive two bolts 218 at each end cap 206. As depicted in FIG. 27 and in FIG. 28 (see also FIG. 29 showing use with current embodiments) the outwardly directed surface of end cap 206 in the region adjacent threaded bolt holes 216 is conventionally formed convex, in particular it is convexly curved from top to bottom, with a curvature approximating a cylindrical surface. Optionally, end cap 206 is tapered from front (towards light source 204) to rear.

A variety of approximately linear lighting arrangements are known, e.g. in U.S. Pat. No. 6,796,680 (Showers); U.S. Pat. No. 8,764,220 (Chan); U.S. Pat. No. 9,279,544 (Dankelmann); and U.S. Pat. No. 9,599,321 (Sorensen).

BRIEF DESCRIPTION OF THE DRAWINGS

Reference should be made to the following detailed description which should be read in conjunction with the following figures, wherein like numerals represent like parts.

DETAILED DESCRIPTION INCLUDING BEST MODE OF A PREFERRED EMBODIMENT

Figure 1:
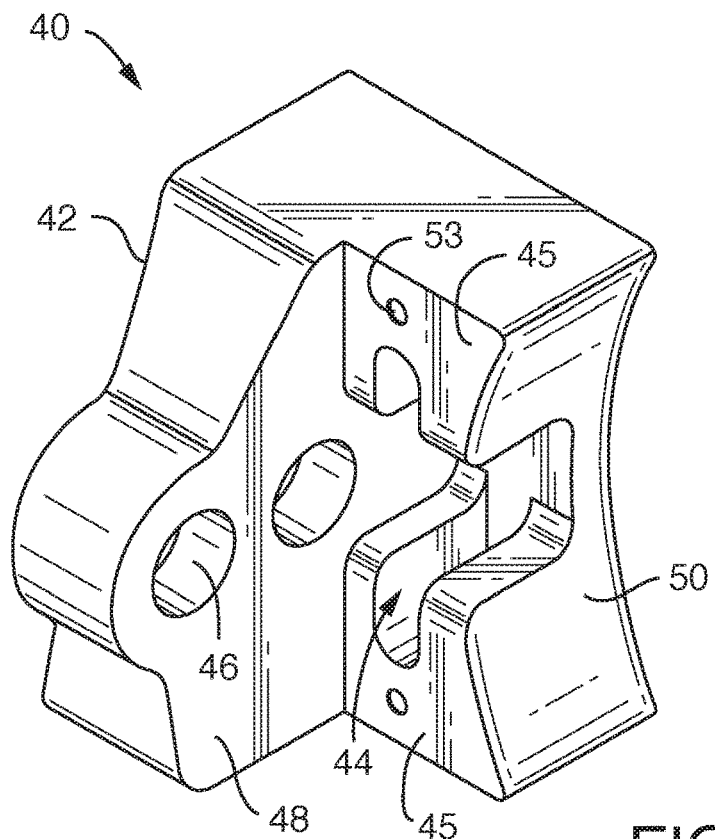
FIG. 1 is a perspective view of second coupling adapter 40 for a light bar, as seen from the top, rear, right side.
Figure 2:
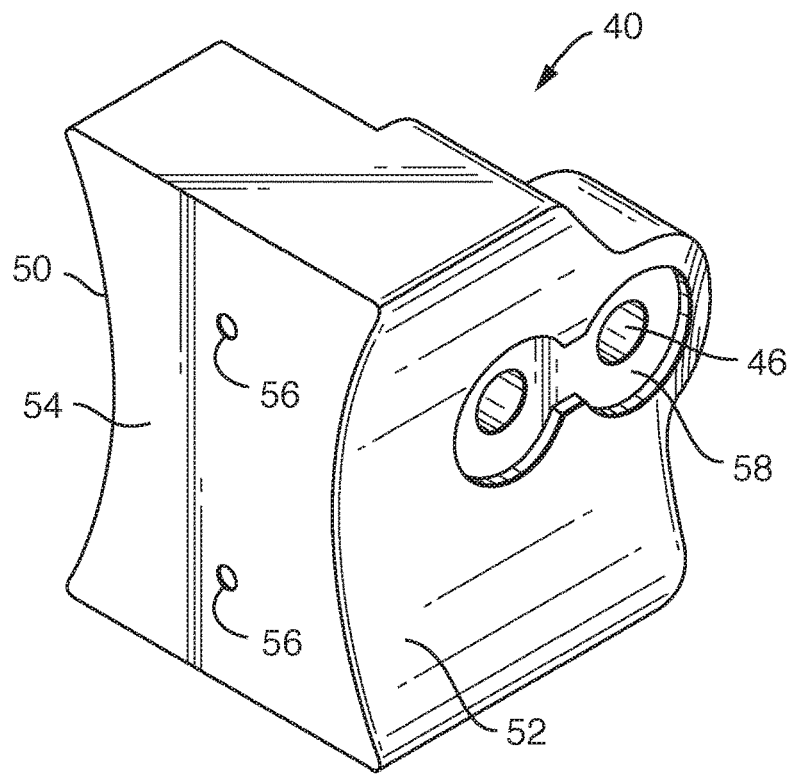
FIG. 2 is a perspective view of adapter 40, as seen from the top, front, left side.
Figure 3:
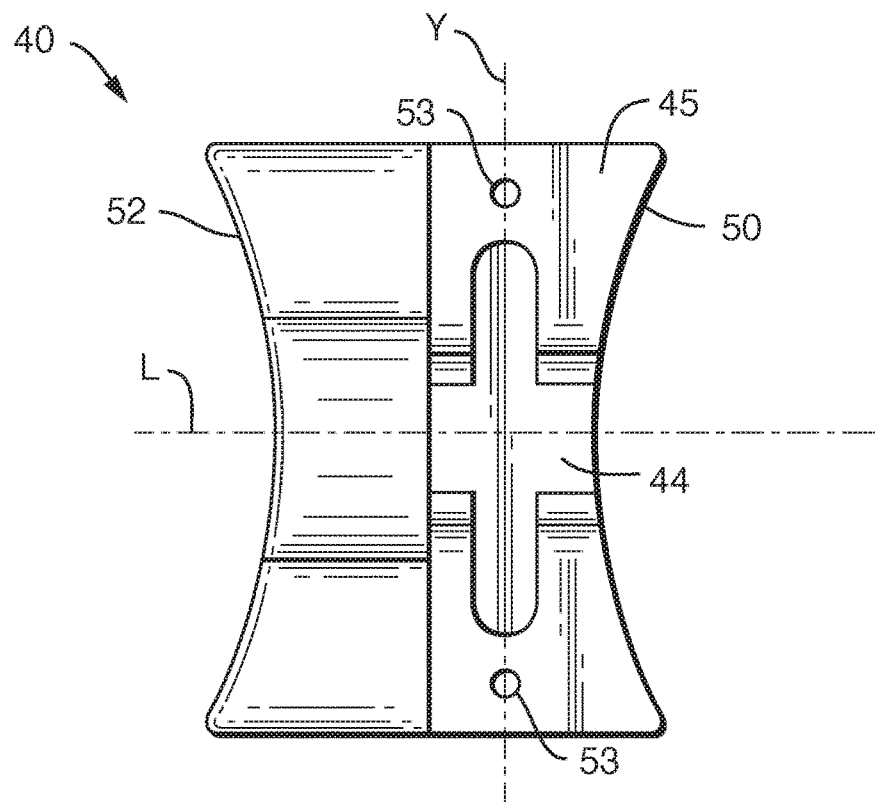
FIG. 3 is a rear elevational view of adapter 40.
Figure 4:
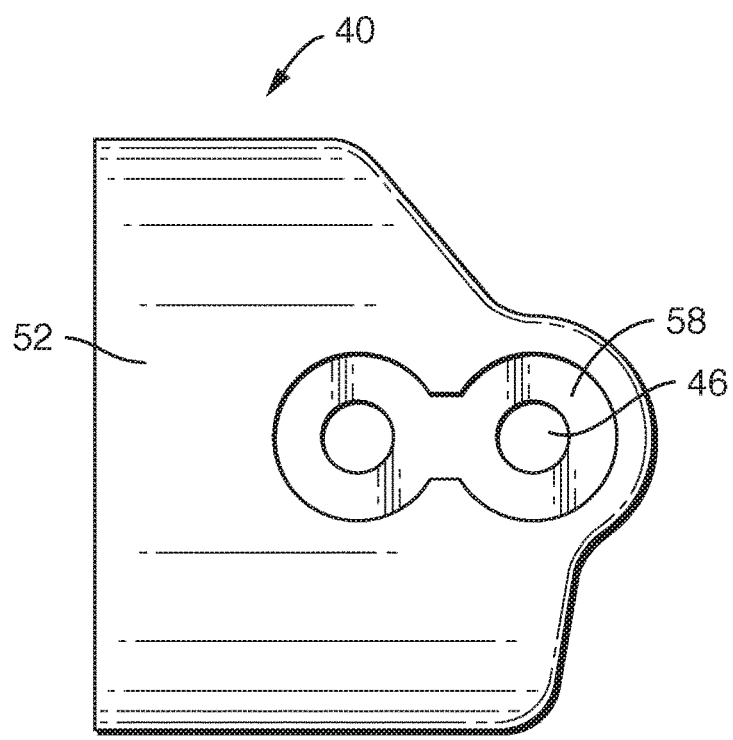
FIG. 4 is a left side elevational view of adapter 40.
Figure 5:
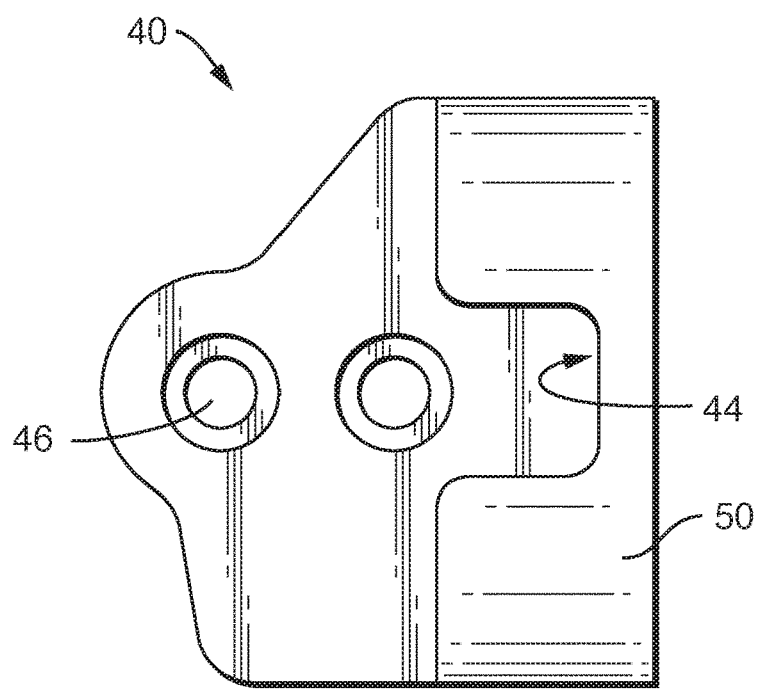
FIG. 5 is a right side elevational view of adapter 40.
Figure 6:
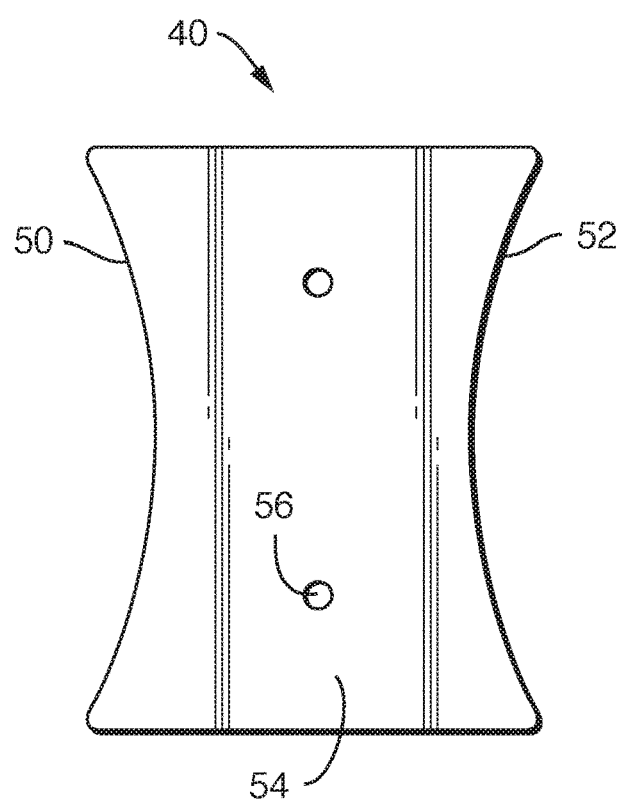
FIG. 6 is a front elevational view of adapter 40.

Applicants herein appreciated that a first adapter can be bolted onto a first LED light bar by using the existing hardware typically commercially supplied with the light bar, and that a second adapter can be bolted onto a second light bar in similar manner, the first and second adapters being configured to couple to one another. Applicants herein appreciated that, for example, a single member such as a length of threaded stock or stud, could not reliably be used to thread into one threaded bolt hole 216 of two opposing, adjacent end caps 206 because it is unlikely that it could be tightened such that two adjacent light bars 200, 201 would be firmly seated and simultaneously positioned in the same direction, and that furthermore road vibration during driving could loosen such a connection. Applicants herein appreciated that such a threaded stud or pin would not be as strong, nor capable of being as firmly tightened as, an individual bolt connecting a single adapter to a single light bar.

A first adapter 10 is shown in FIGS. 12-21, and a second adapter 40 is shown in FIGS. 1-11. Referring to FIGS. 12-21, first adapter 10 has a body 12. Body 12 may be formed slab-like as shown, relatively thinner than it is tall. Adapter 10 has engagement structure 16 to engage and attach firmly to first light bar 200. Engagement structure 16 is preferably formed as one hole, or more preferably two holes 16, that align with one or both respective holes 216 on light bar 200. A bolt, see bolt 218 in FIG. 29, passes through hole 16 and is tightened into threaded hold 216 on light bar 200. Holes 16 are countersunk, see FIGS. 13, 15, 21, so that hex heads of bolt 218 are recessed below the flank of body 12, from this side recessed below surface 28, see also FIG. 29. While having one hole 16 connected to a hole 216 in light bar 200 by bolt 218 when sufficiently tightened can securely retain adapter 10, including irrotationally secure adapter 10 to light bar 200, it is preferred to have two holes 16 thus bolted by two respective bolts 218, so as to better prevent rotation, for example by avoiding a potential single pivot axis situation.

First adapter 10 (also called interconnect member) can contain various surface features that promote orienting and/or securing it to light bar 200. These features can be provided separately or in combination. A recess 26 on body 12 adjacent holes 16 conforms in shape to one or more bosses 226 surrounding threaded bolt-receiving holes 216 on light bar 200. This shape-conforming feature promotes irrotational connection of adapter to light bar. Body 12 has a curved profile with curved abutment surface or cheek 28, which abuts to curved surface 222 of end cap 206 to enhance shape conforming mating and reduce misalignment.

Figure 22:
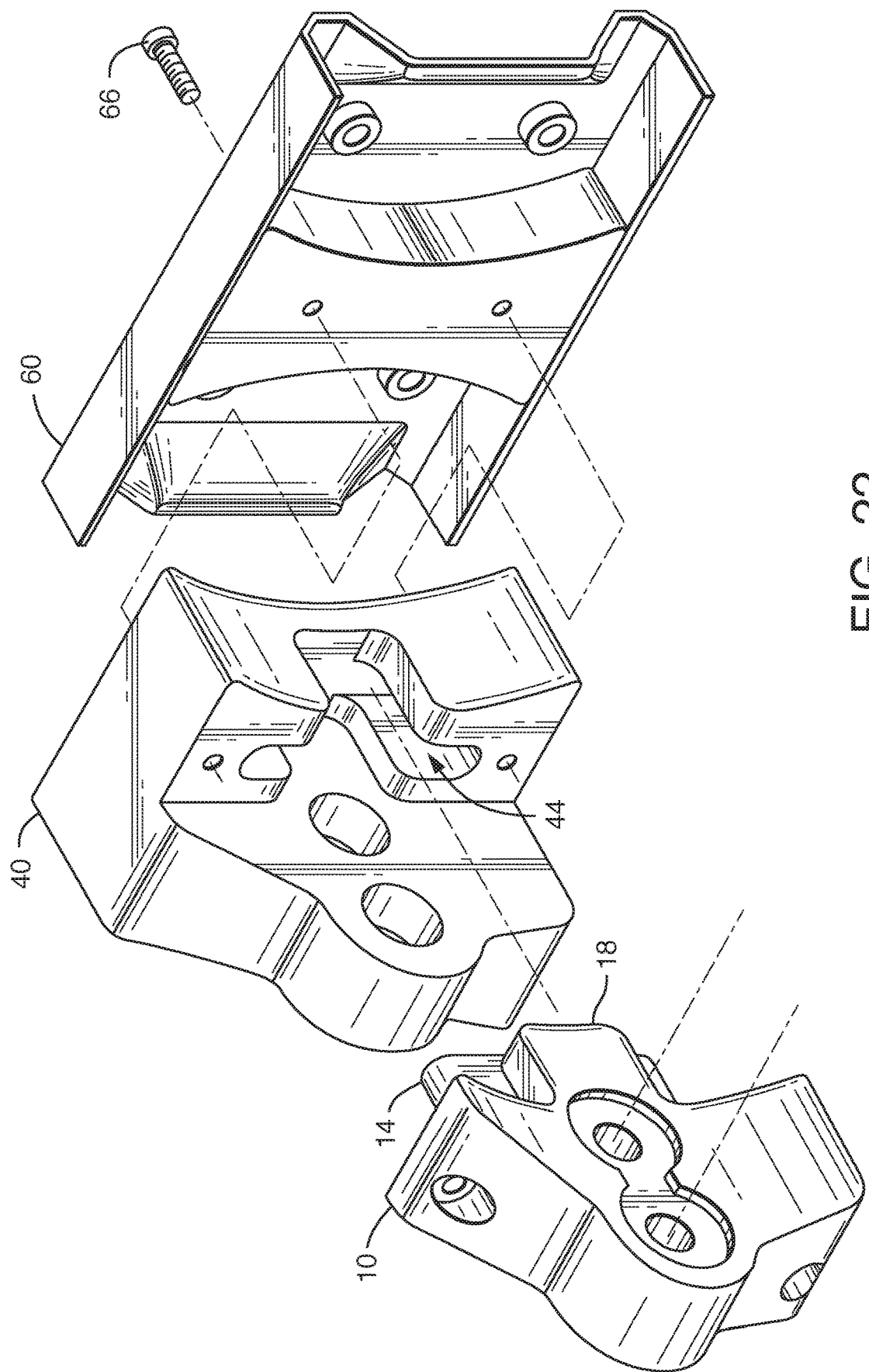
FIG. 22 is a perspective exploded assembly view of adapters 10, 40 oriented for interfitting and mating with optional cover plate 60, as seen from the rear, top, right side.
Figure 23:
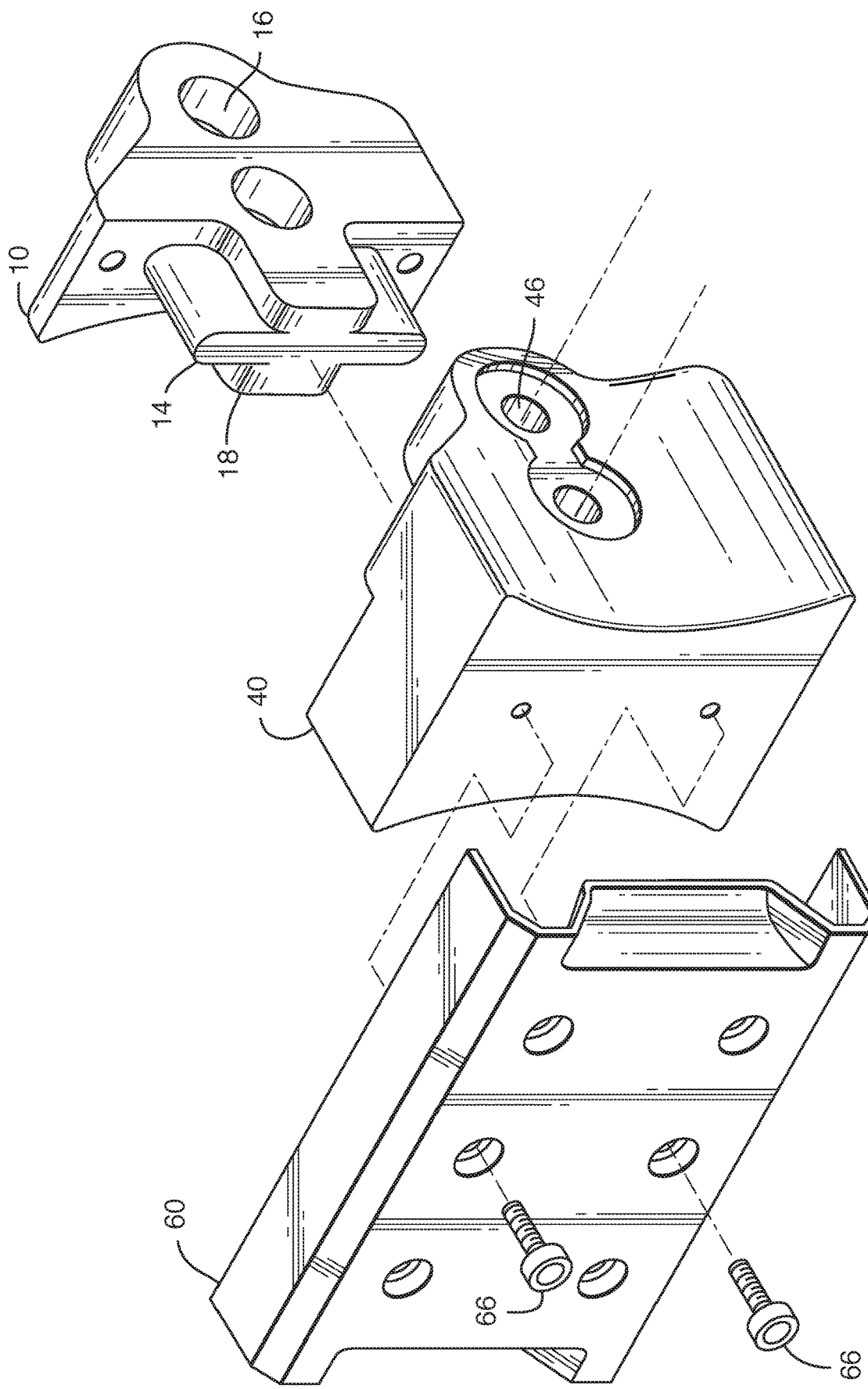
FIG. 23 is a perspective exploded assembly view of adapters 10, 40 oriented for interfitting and mating with optional cover plate 60, as seen from the front, top, left side.
Figure 24:
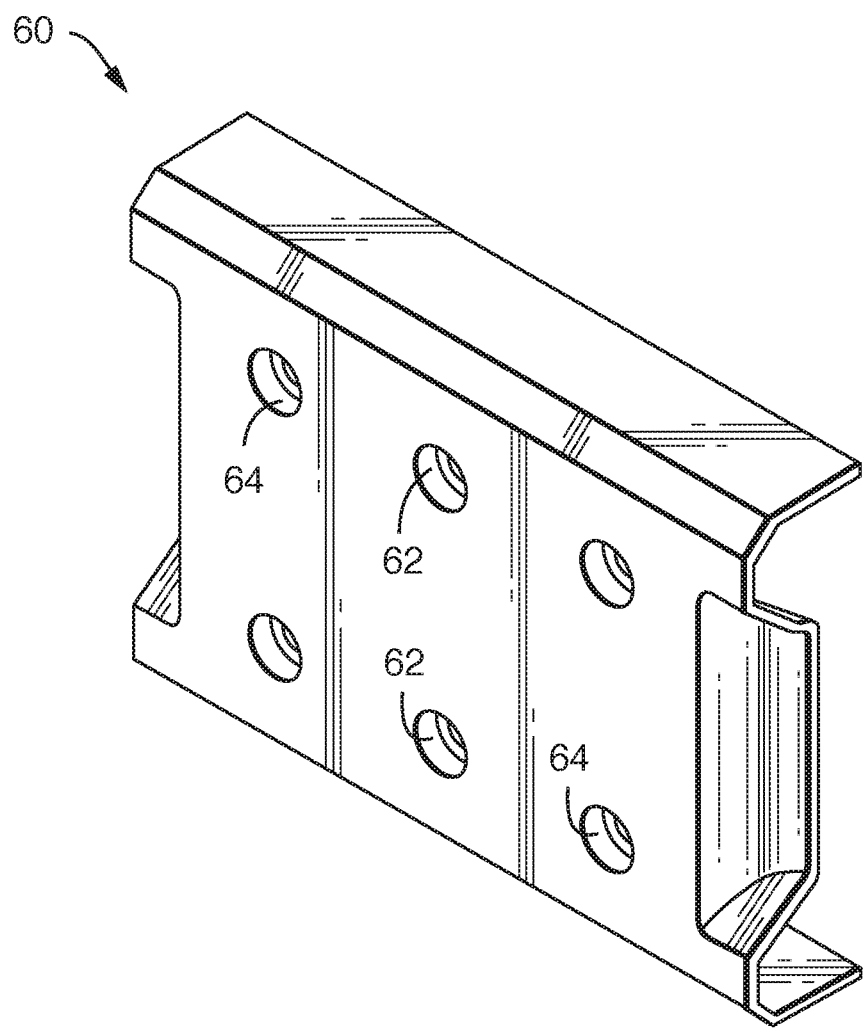
FIG. 24 is a perspective view of cover 60, as seen from the front, top, left side.
Figure 26:
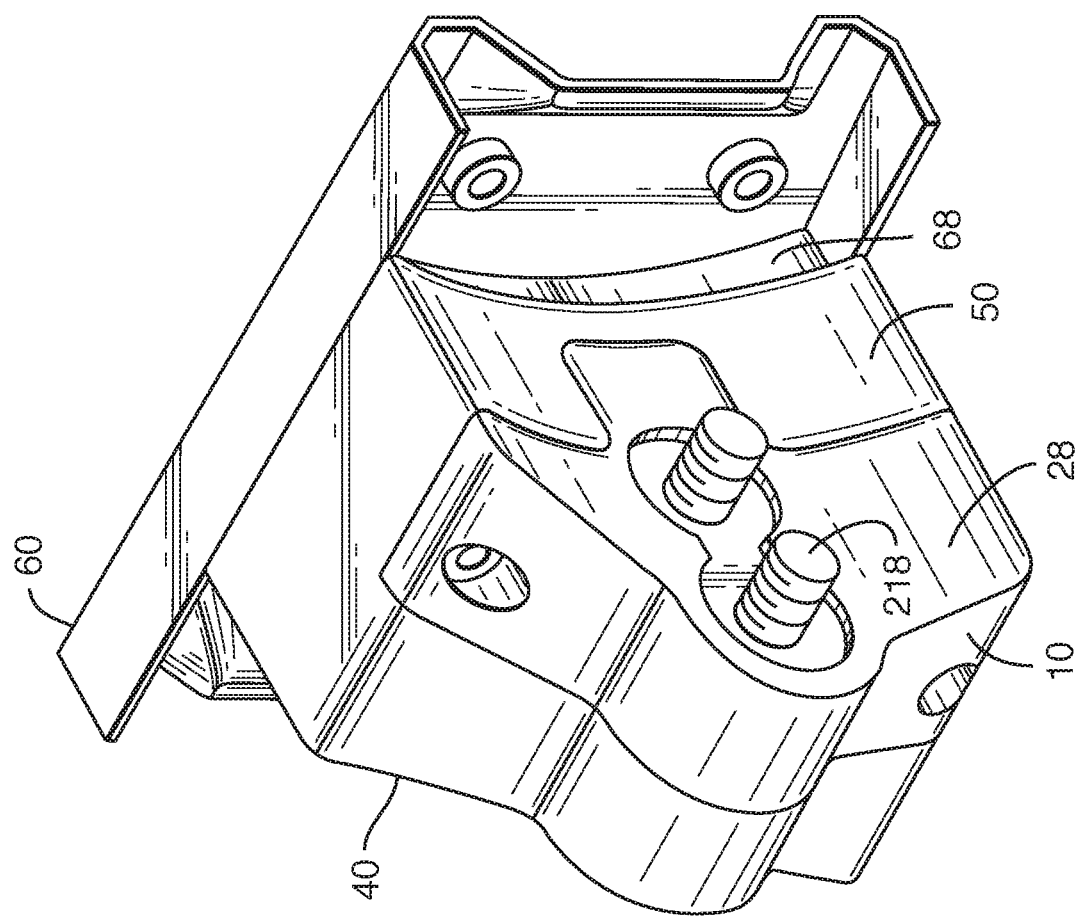
FIG. 26 is a perspective assembly view of the interfitted adapters 10, 40 with optional cover plate 60, as seen from the top, rear, right side.

A second adapter 40 or interconnect member shown in FIGS. 1-11 is configured to mate with first adapter 10 as shown in FIGS. 22-23 and FIG. 26. Second adapter 40 has body 42. Body 42 is formed approximately twice as wide as first adapter 10. In a manner analogous to first adapter 10, second adapter 40 has holes 46 and optional recesses 58 to enable coupling by bolts 218 to light bar 201, see FIG. 29. Second adapter 40 has two opposed curved abutment surfaces of cheeks, one is a partial curved receiving surface 50 and, on the opposite lateral side, a curved abutment surface or cheek 52 that abuts curved surface 22 of end cap 206 of light bar 201.

Adapter 10 is provided with at least one projection or tenon. For example, adapter 10 has a first projection or tang 14. Tang 14 can also be referred to as first tenon 14. When adapter 10 is coupled to light bar 200, tang 14 is vertically oriented, with a vertical virtual axis Y perpendicular to longitudinal axis L of light bar 200. Adapter 10 is also preferably provided with a second projection or tenon. For example, adapter 10 has a second projection or tang 18, which can also be referred to as second tenon 18. Second tang 18 forms a shoulder adjacent to first tenon 14. Advantageously, second tenon 18 is arranged transverse to, e.g. perpendicular to, first tenon 14. Body 12 advantageously has flat abutment surface 24 opposite to curved cheek 28, for abutment with second adapter 40 as discussed hereinbelow.

Figure 25:
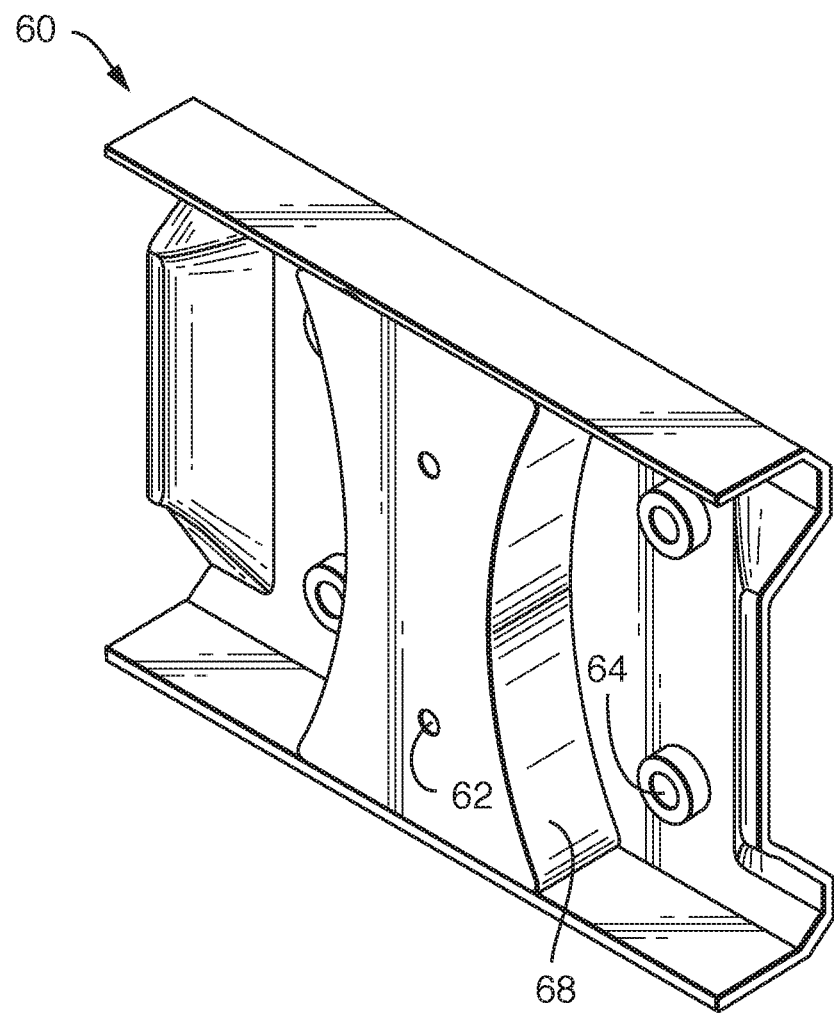
FIG. 25 is a perspective view of cover 60, as seen from the rear, top, right side.

Second adapter 40 is provided with optional screw holes 56 formed in flat surface 54 for attachment of optional cover 60 at its rear flat surface (see FIG. 25), discussed hereinbelow.

Second adapter 40 has a slot-like, vertically-oriented pocket or recess 44 into which tang 14 fits. Recess 44 is also referred to as a socket. Socket 44 is akin to a mortise, and tang 14 to a tenon, and collectively first and second adapters 10 and 40 form a mortise and tenon joint. If first adapter 10 advantageously has a second tenon 18, shaped approximately like a "plus"-sign as in FIGS. 13 and 17, then pocket or mortise 44 is similarly shaped like a "plus"-sign shaped recess shown in FIGS. 1, 3 and 10. When first tenon 14 is nested into the vertical receiving slot portion of mortise 44, then horizontally-oriented second tenon 18 is received into horizontally-oriented cut-out portion of mortise 44. Second tenon 18 thus forms snug abutment surfaces formed as shoulders on each side of vertically-oriented first tenon 14. Tenon 14 fitted into mortise 44 resists rotation about the vertical Y-axis shown in FIGS. 3 and 17 when first and second adapters 10, 40 are interfit or coupled as shown in FIG. 26; this aspect of the joint helps resist, referring to FIGS. 29, 30 and 31, a rotation of light bar 200 relative to light bar 201 into and out of the page of FIG. 31. Furthermore, shoulders or second tenon 18, extending transverse first tenon 14, received in horizontally-extending portion of mortise 44, tends to resist rotation about the longitudinal L-axis shown in FIGS. 3 and 17; this aspect of the joint helps resist, referring to FIGS. 29-31, a rotation of light bar 200 relative to light bar 201 up and down in the plane of the page of FIG. 31. When first and second adapters 10, 40 are interfit, surface 22 of first adapter 10 comes into abutment with correspondingly shaped surface 45 of second adapter 40, and surface 24 of first adapter 10 comes into abutment with correspondingly-shaped surface 48 of second adapter 40. The pair of surfaces 22, 45 and 24, 48 are transverse, in preferred embodiments perpendicular to, one another. These abutting surface pairs further contribute to resisting rotation about the vertical Y-axis and longitudinal L-axis, respectively. It is convenient that surfaces 22, 45 and 24, 48 are formed as flat surfaces.

Figure 7:
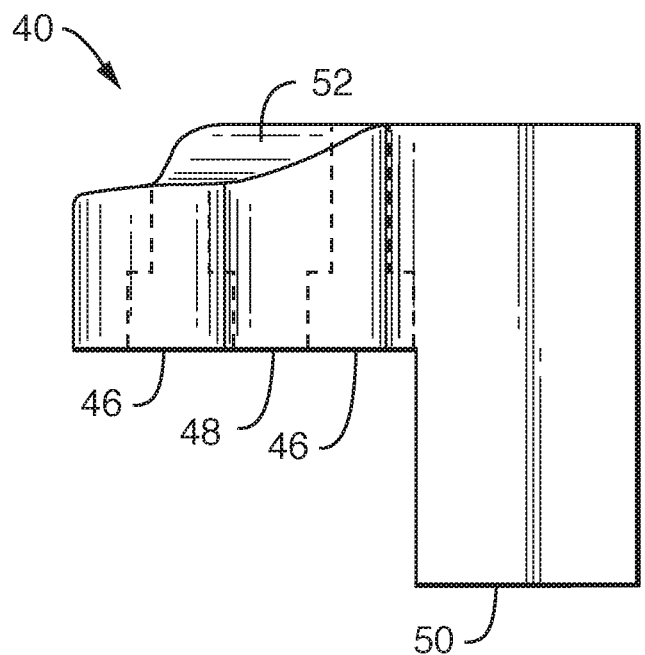
FIG. 7 is a top plan view of adapter 40.
Figure 8:
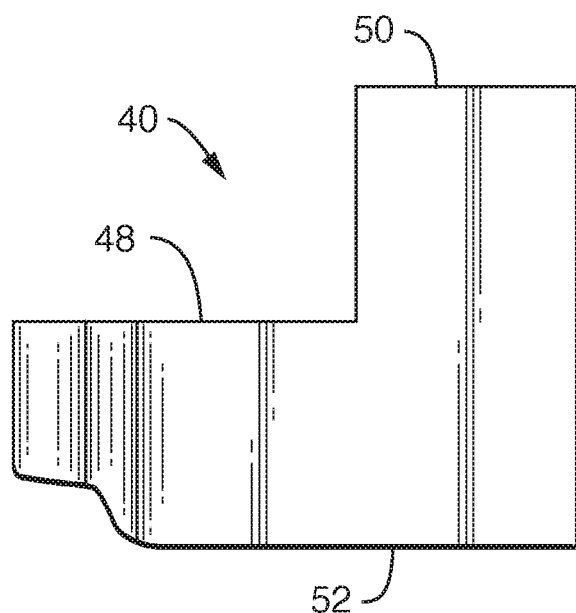
FIG. 8 is a bottom plan view of adapter 40.
Figure 9:
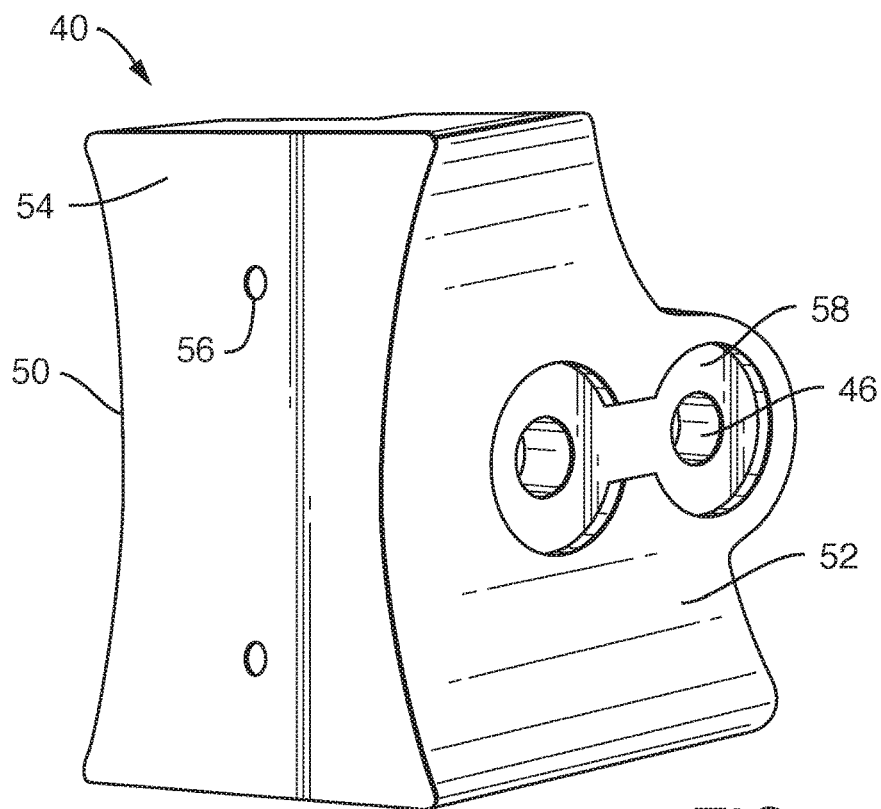
FIG. 9 is a perspective view of adapter 40, as seen from the top, front, left side.
Figure 10:
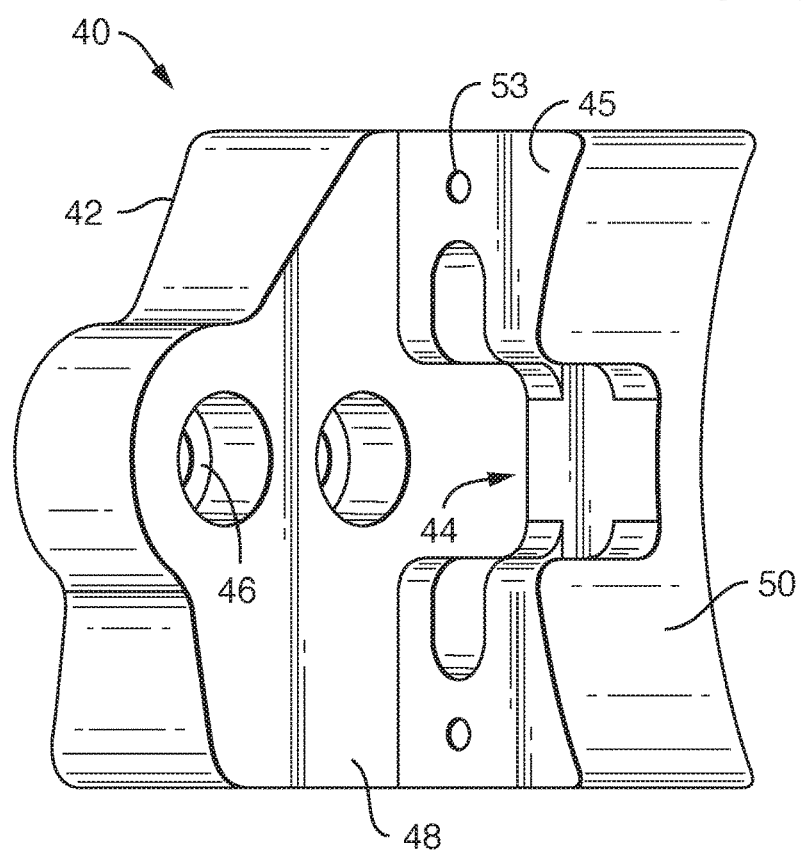
FIG. 10 is a perspective view of adapter 40 as seen from the top, rear, right side.
Figure 11:
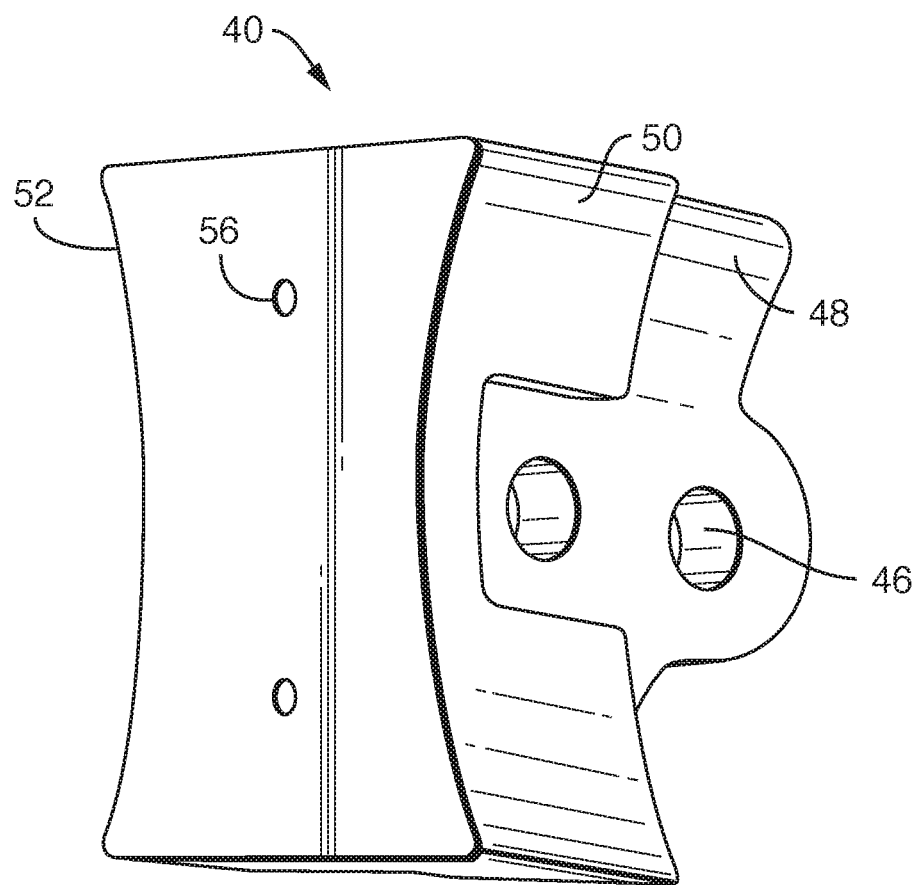
FIG. 11 is a perspective view of adapter 40, as seen from the bottom, front, right side.
Figure 12:
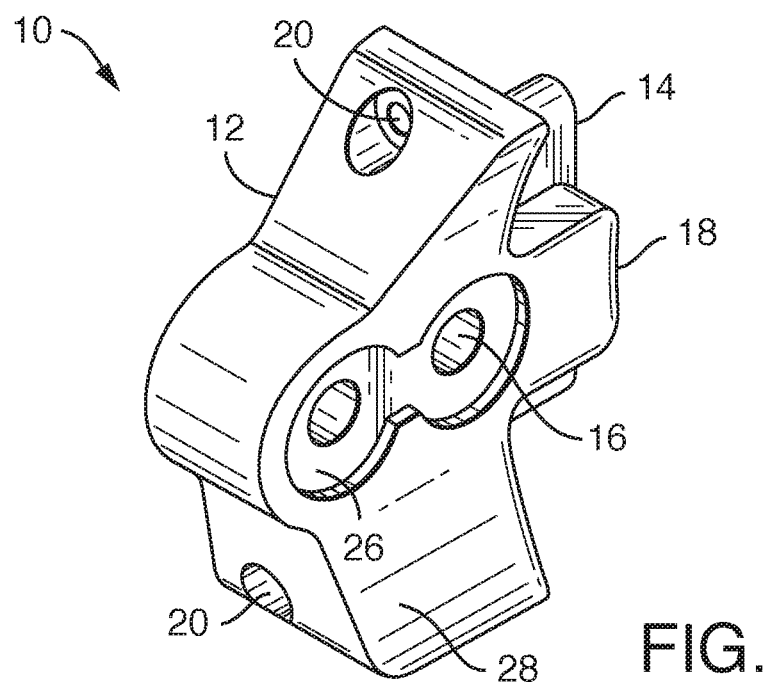
FIG. 12 is a perspective view of first coupling adapter 10 for a light bar, as seen from the top, rear, right side.
Figure 13:
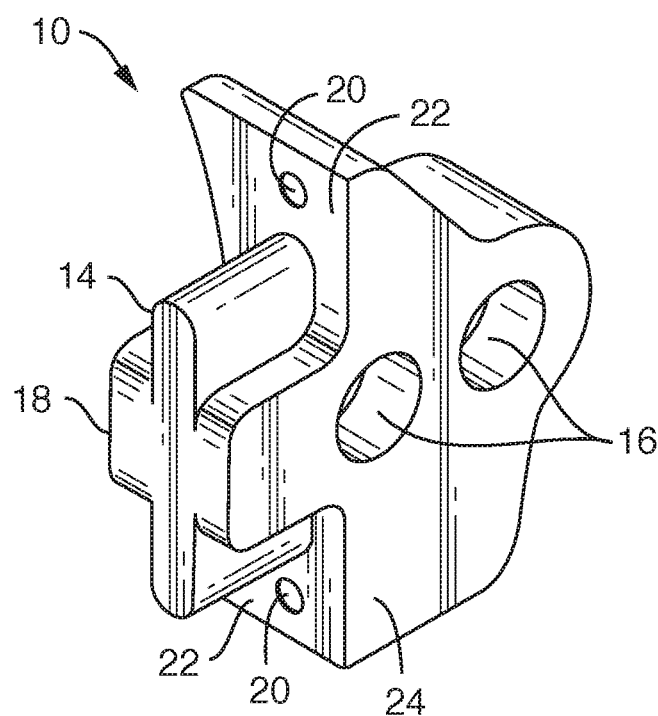
FIG. 13 is a perspective view of adapter 10, as seen from the top, front, left side.
Figure 14:
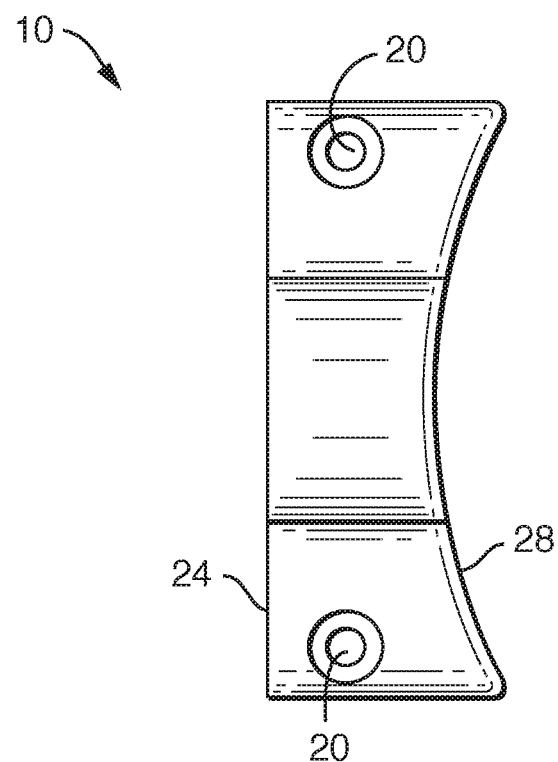
FIG. 14 is a rear elevational view of adapter 10.
Figure 15:
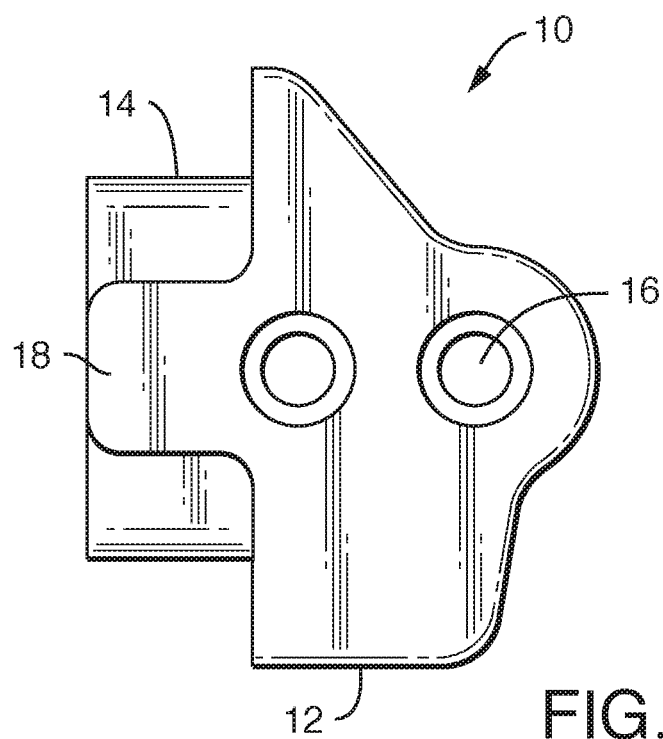
FIG. 15 is a left side elevational view of adapter 10.
Figure 16:
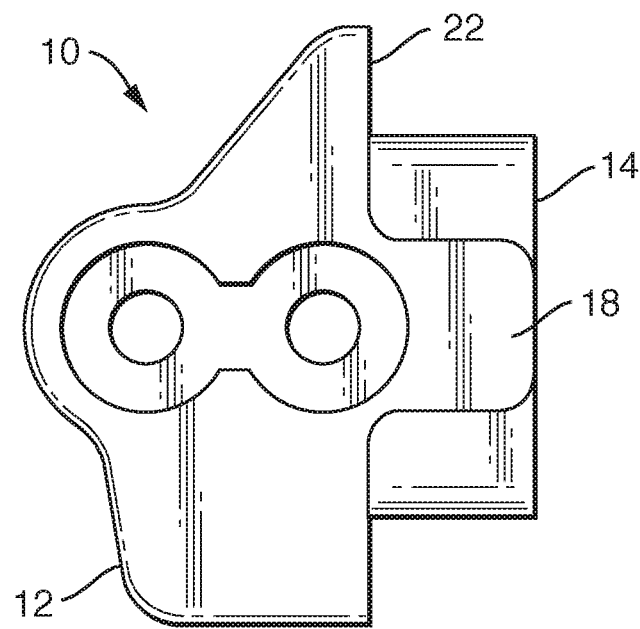
FIG. 16 is a right side elevational view of adapter 10.
Figure 17:
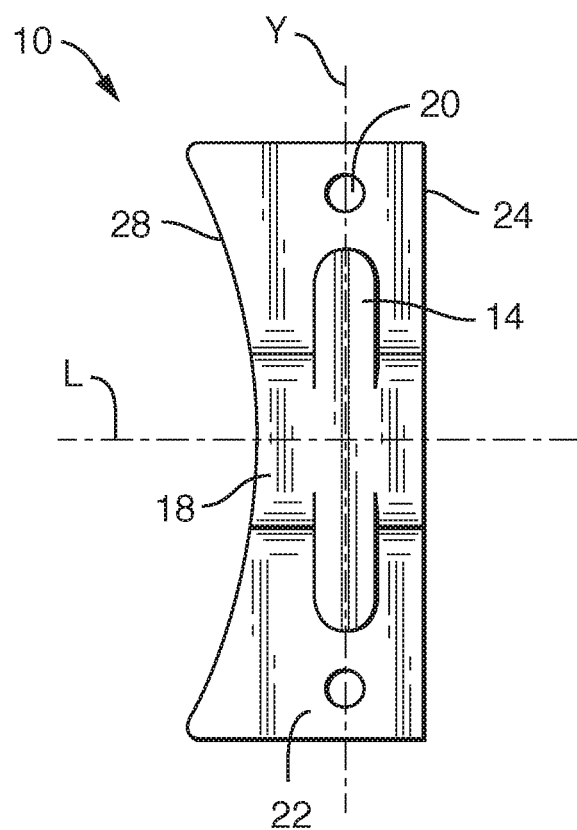
FIG. 17 is a front elevational view of adapter 10.
Figure 18:
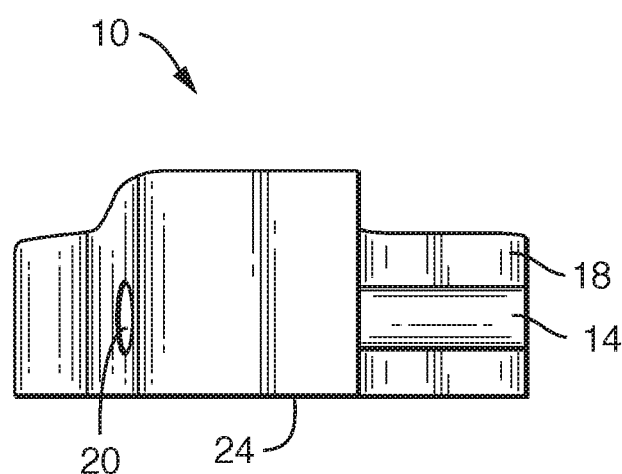
FIG. 18 is a bottom plan view of adapter 10.
Figure 19:
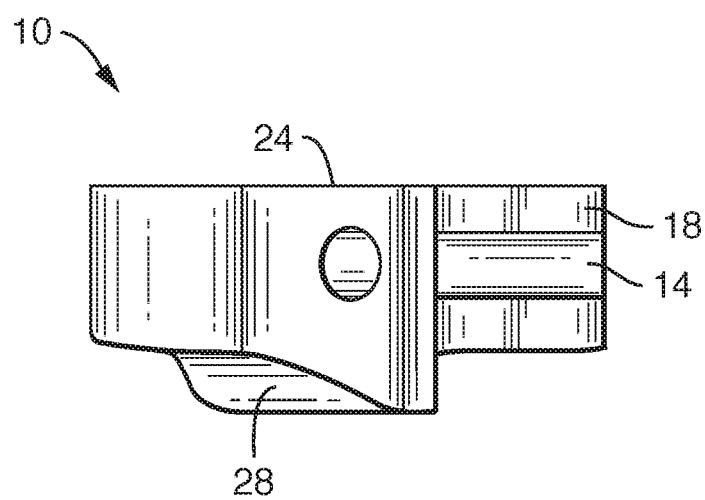
FIG. 19 is a top plan view of adapter 10.
Figure 20:
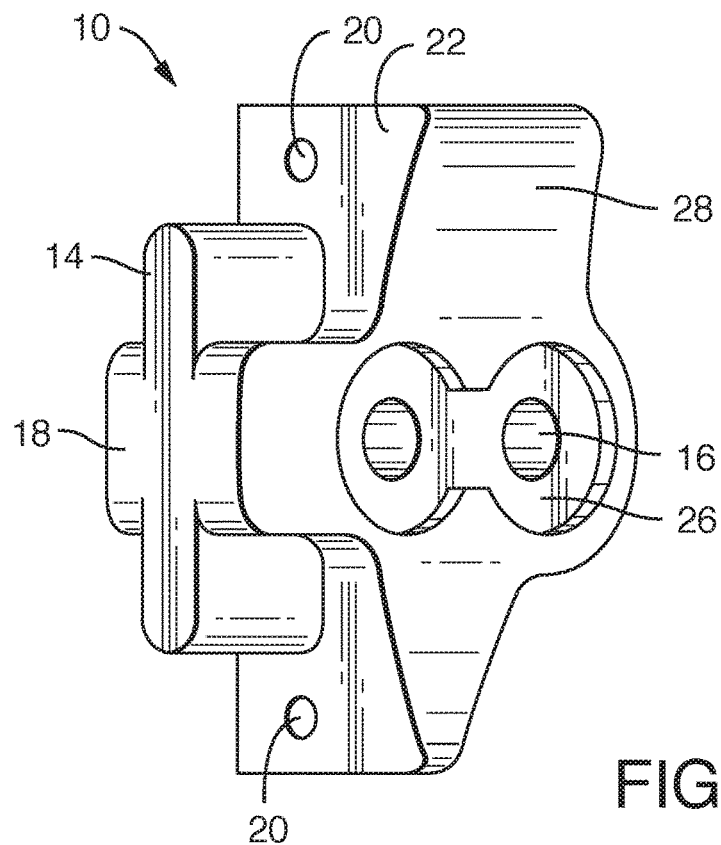
FIG. 20 is a perspective view from the bottom, front, right of adapter 10.
Figure 21:
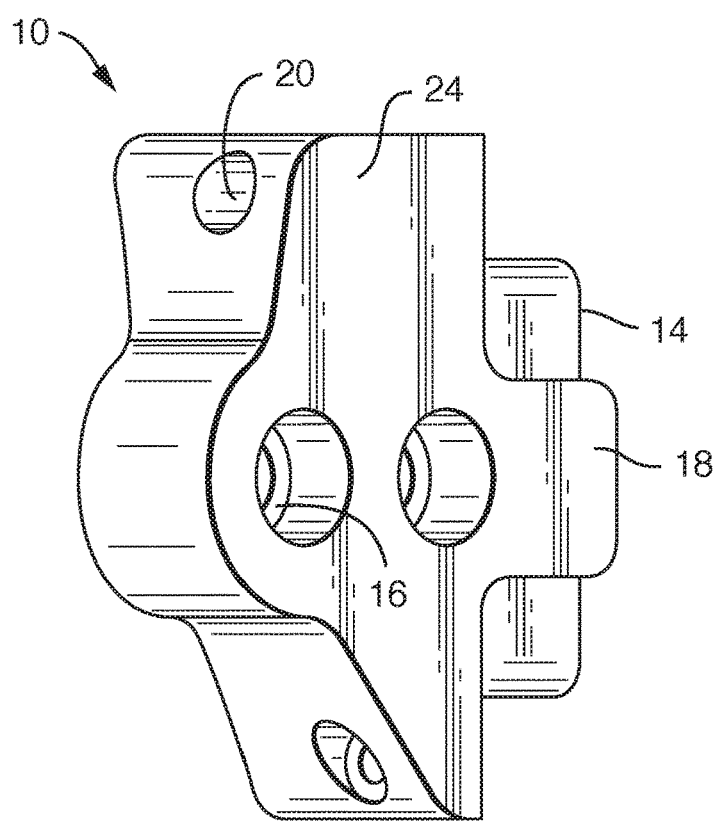
FIG. 21 is a perspective view of adapter 10 from the bottom, rear, left of adapter 10.

FIG. 7 shows in top plan view second adapter 40 and schematically, with dashed lines, shows recessed bolt holes 46 (dashed line holes not shown to scale).

Figure 29:
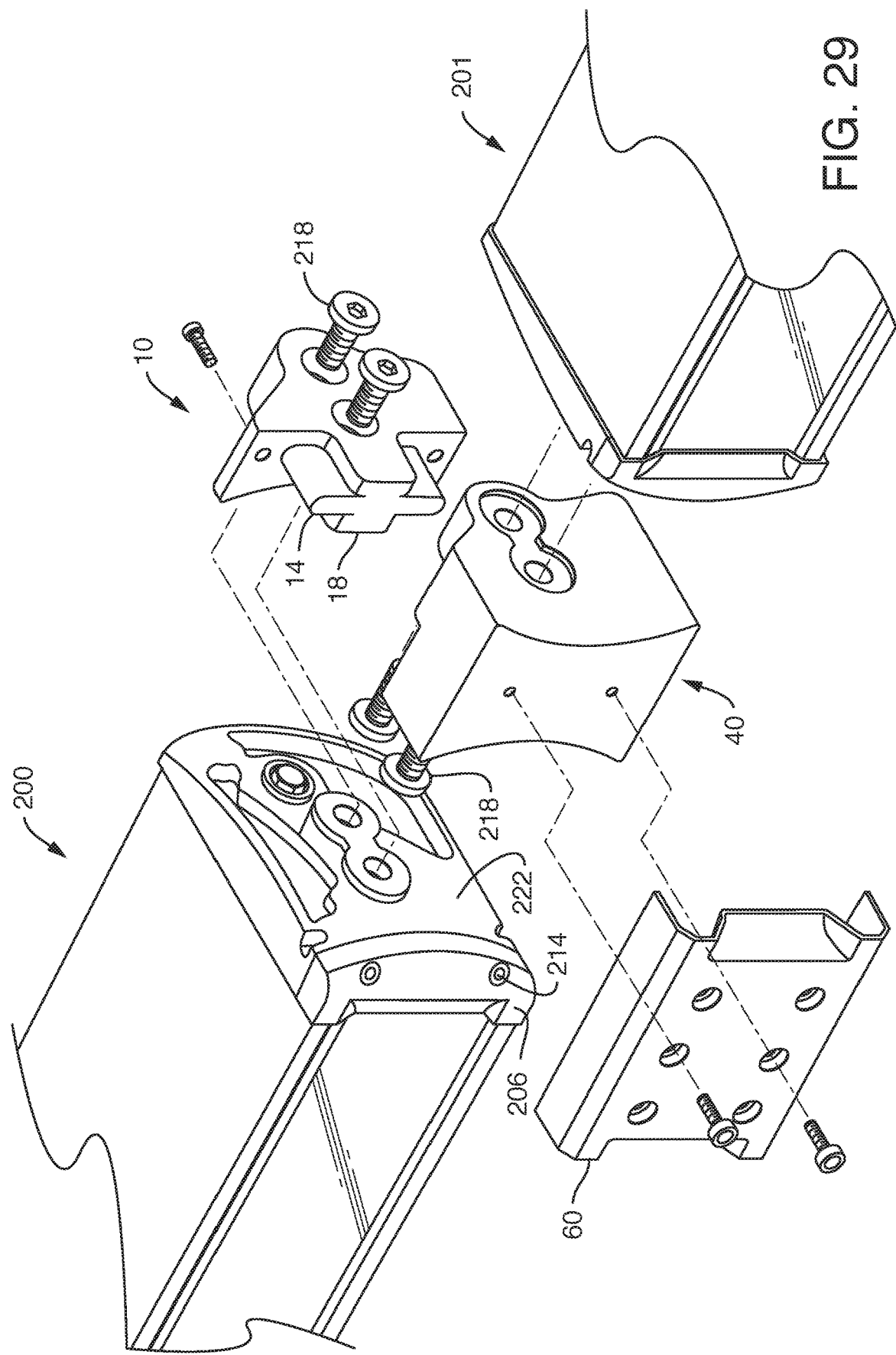
FIG. 29 is a perspective exploded assembly view of adapters 10, 40 oriented for coupling together joining two light bars 200, 201, with optional cover plate 60, as seen from the top, front, left side.
Figure 30:
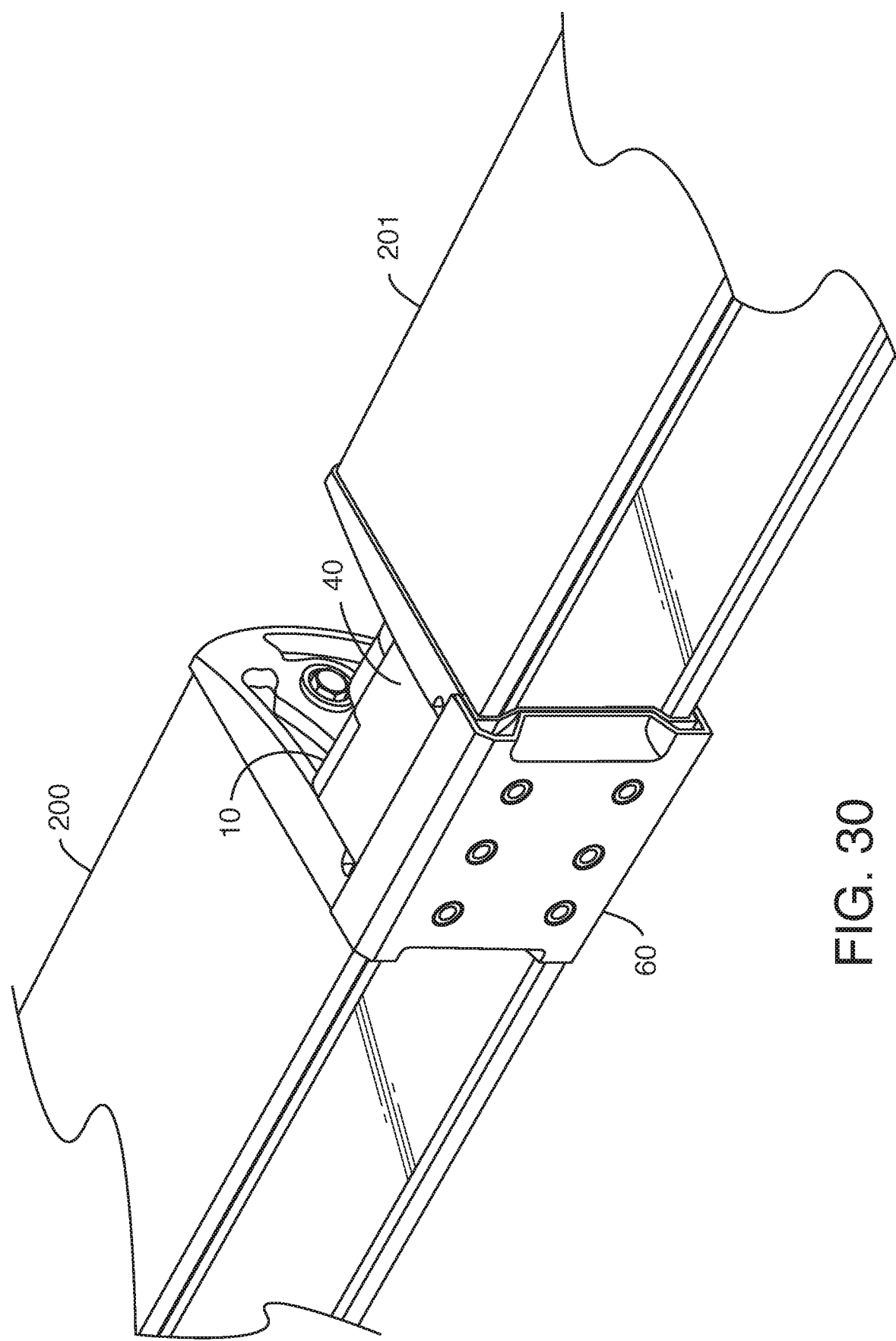
FIG. 30 is a perspective assembly view of the coupled adapters 10, 40 joining two light bars 200, 201, with optional cover plate 60, as seen from the top, front, left side.
Figure 31:
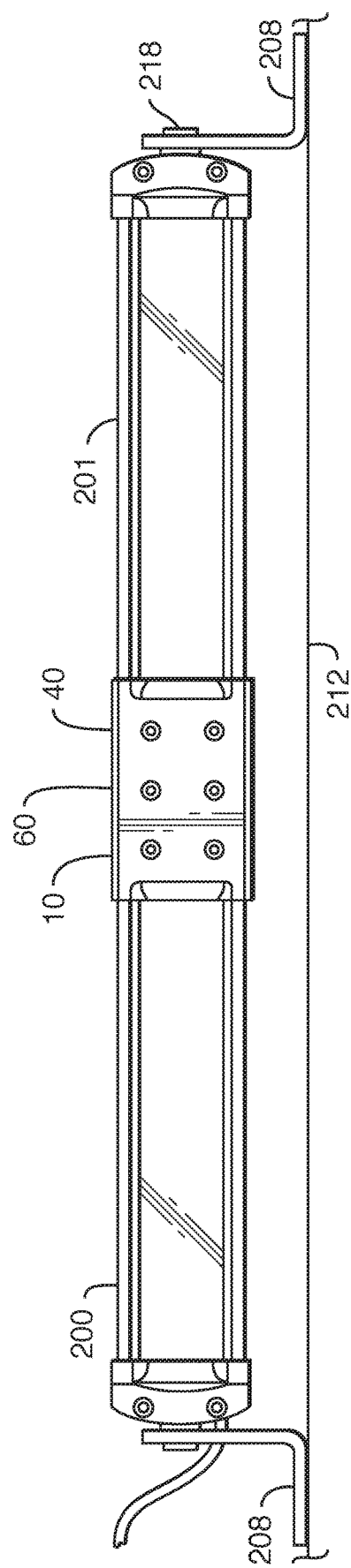
FIG. 31 is a front elevational assembly view of the coupled adapters 10, 40 joining two light bars 200, 201, with optional cover plate 60.

Referring to FIGS. 24-25 and FIGS. 22-23, cover 60 can optionally be used to give the interfit adapters 10, 40 when coupled to light bars 200, 201 a desired aesthetic look, at least partially concealing adapters 10, 40 from a front view when mounted on a vehicle, see FIG. 30 and FIG. 31. Additionally, cover 60 can be screwed to, on the one hand, adapter 40 via screws 66 (FIG. 22-23) inserted into holes 62 and holes 56 on adapter 40 (see FIG. 2), and on the other hand, to light bars 200, 201 via screws 214 (see FIG. 29) inserted through holes 64 into front faces of end caps 206 of the light bars. Advantageously, a rear surface (FIG. 25) of cover 60 can have a profile that is a curved surface 68 configured to conform to peripheral lateral curved edges of end caps 206 of the light bars, since cover 60 partially overlies the end caps, as shown in FIGS. 29-30. Referring to FIG. 26, in the coupling assembly formed of the interfit adapters 10, 40 and attached cover 60, curved profile 68 is recessed relative to curved abutment surface 50 of second adapter 40, forming a receiving cavity for a peripheral lip of end cap 206 of the light bar as shown in FIG. 29. Optionally, referring to FIGS. 24-25, an outer peripheral contour of cover 60 can conform to portions of end caps 206 of the light bars. Further optionally, a front surface (FIG. 24) of cover 60 can be decorated with a design, logo or trade name.

First adapter 10 can be secured with bolts 218 either to light bar 200, or by turning it upside down, alternatively to light bar 201; thus, it is not orientation-dependent, because on conventional light bars 200, 201, the threaded bolt holes 216 are, seen in vertical direction, at about the middle; thus, holes 16 and holes 46 are vertically located in the middle of respective adapters 10, 40 in order to provide less orientation-dependent mounting to light bar 200 or 201.

Optionally, first adapter 10 can be further secured to second adapter 40 by small screws passing through holes 53 in second adapter 40 into receiving holes 20 in first adapter 10.

FIG. 26 is a cut-away in the sense that the light bar 200 to which adapter 10 would be bolted by bolts 218 is not shown, in order to show details of the coupling assembly formed by interfitted first and second adapters 10, 40. Referring to FIG. 26, in the coupling assembly formed by interfitted first and second adapters 10, 40, the curved surfaces 28, 50 of the respective adapters are aligned and abutting and thus collectively define a continuous curved abutment surface on its lateral side, to better receive curved surface 222 of end cap 206 of a light bar, see FIG. 29.

Referring to FIGS. 1-26, first adapter 10, second adapter 40, and cover 60 are to drawn to scale, and shown about one-third larger than actual size of a suitable embodiment that fits commercially available light bars 200, 201 of the 10-inch or 20-inch length sold under the Sylvania trade designation "S-Series LED Lightbar." The adapters can be molded or formed (e.g. by additive manufacturing such as "3D printing") from a suitable commercial plastics material, such as ABS or nylon or fiber-reinforced nylon as well-known to those of skill in the molding field, or could be molded (or machined) of a metal such as aluminum. The adapters function as a mechanical joint, and do not provide an electrical connection, thus there are no particular electrical requirements of the material of which they are formed. The adapters do not need to function as a heat sink, though if made of a heat-conducting material, might contribute to heat-sinking; however, commercial embodiments of light bars 200, 201 have plastic end caps 206 and the heat sink is provided directly on light bar housing 202 which is typically formed of an extruded aluminum with integrally molded heat sink fins at the rear to absorb heat from the LEDs at light emitting region 204.

Figure 27:
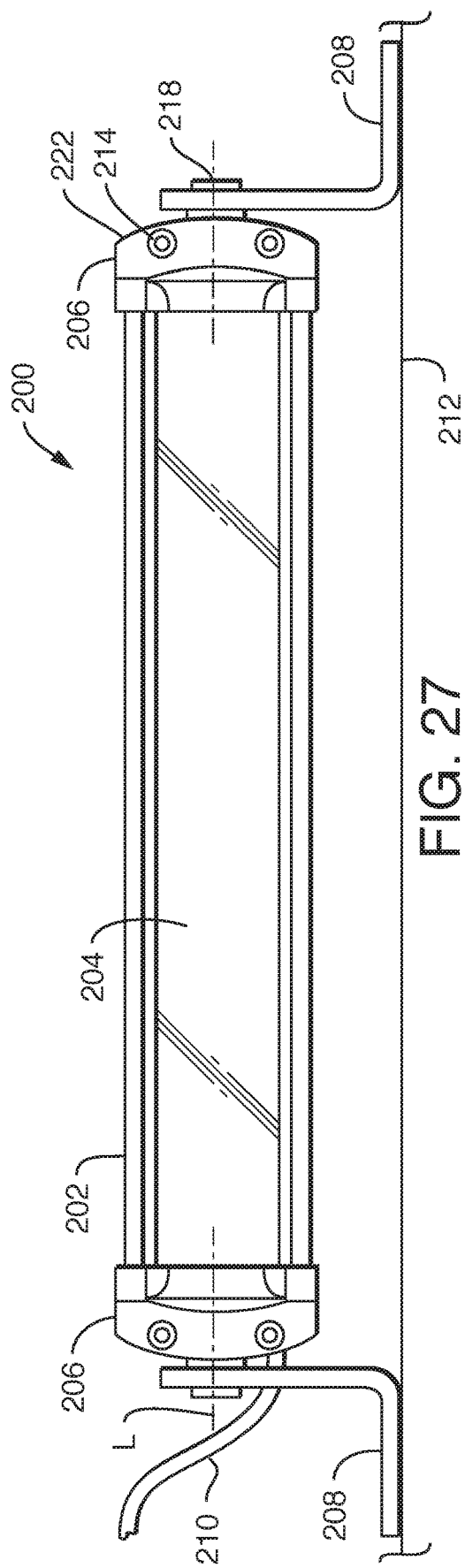
FIG. 27 depicts a prior art 10-inch light bar 200 mounted on vehicle roof 212.
Figure 28:
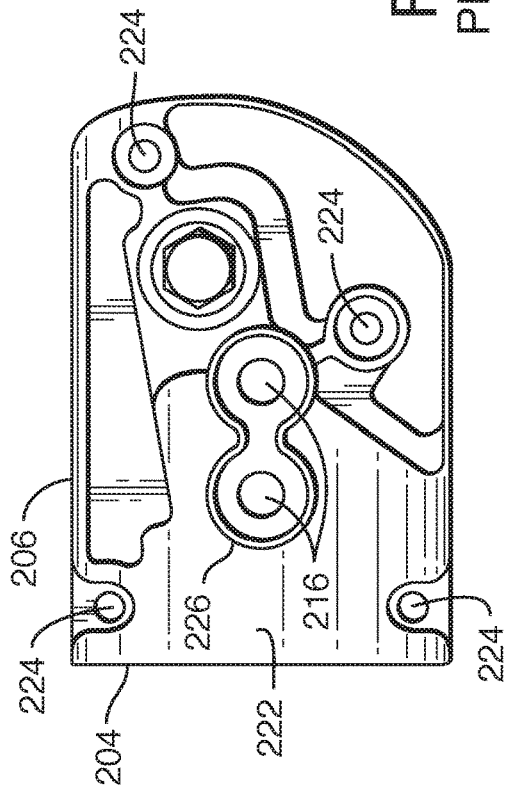
FIG. 28 depicts a prior art lateral end of light bar 200.

In operation, and referring to FIGS. 22 and 29-31, first adapter 10 is bolted by bolts 218 to a lateral side of end cap 206 of first light bar 200, shown in exploded assembly perspective view in FIG. 29. Second adapter 40 is bolted by bolts 218 to a lateral side of end cap 206 of first light bar 201, see FIG. 29. For both adapters, bolts 218 are repurposed from the mounting hardware conventionally supplied with a surface attachment mechanism, also referred to as mounting L-bracket 208 (FIG. 27), which L-bracket is then not attached to the mutually facing end caps 206 of respective light bar in embodiments herein. Referring to FIG. 22, then first adapter 10 with its tenon 14 and second tenon 18 is slid linearly, like a rail, using a translating motion, into receiving recess or mortise 44 of second adapter 40. Thus, light bars 200 and 201 are coupled together. At opposite end caps 206, mounting L-brackets 208 are bolted to vehicle roof 212, resulting in a generally rigid overall assembly. Optionally, first and second adapters 10, 40 can be screwed together by small screws passing through holes 20 in first adapter 10 and received into holes 53 on second adapter 40. Further optionally, cover 60 can be screwed to adjacent end caps 206 of light bars 200, 201, and, if desired, also to the coupling assembly formed by the interfit first and second adapters 10, 40 via small bolts or screws 66 (FIG. 22) received into threaded holes 56 in surface 54 of adapter 40, the flat surface on a rear of cover 60 in which holes 62 are formed abutting with surface 54.

As seen in FIG. 29, each adapter is assigned to only one light bar; that is, when bolts 218 connect an adapter to a light bar, that adapter is not connectable to the other light bar. That is, not only do the holes 16 or 46 then become occupied by the two bolts 218, but also since the adapter's curved surface (28, or 50) has now come into abutment with curved surface 222 of an end cap 206, there is no longer a way to access tightening a bolt to the other light bar. Thus, the other adapter is tightened in like manner to the other light bar, and then the two adapters are interfit to one another forming a coupling assembly that securely connects first light bar 200 to second light bar 201. Stated in other words, and referring to FIG. 29, the bolts 218 that attach first adapter 10 to first light bar 200 do not simultaneously connect to second adapter 40; and likewise, the bolts 218 that attach second adapter 40 to second light bar 201 do not simultaneously penetrate into first adapter 10.

Referring to FIGS. 30-31, advantageously, it is not necessary to have L-bracket 208 support the midspan of connected light bars 200, 201, thus saving on drilling holes in vehicle roof 212, and providing a desired cleaner, more streamlined aesthetic appearance. The joined light bars are self-supporting at locations between opposite L-brackets 208. The coupling assembly formed by interfitted adapters 10, 40 resists a torque or rotation about the longitudinal axis L that could otherwise tend to separate the affixed light bars 200, 201.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. Those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used.

Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

Definitions, as defined and used herein, control over dictionary definitions, definitions in documents incorporated by reference, or ordinary meanings of the defined terms.

The indefinite articles "a" and "an," as used herein in the specification and in the claims, unless clearly indicated to the contrary, are understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

An abstract is submitted herewith, being provided to comply with the rule requiring an abstract to allow examiners and searchers to ascertain the general subject matter of the technical disclosure. It is submitted with the understanding that it will not be used to interpret or limit the scope or meaning of the claims, as set forth in the rules of the U.S. Patent and Trademark Office.

The following, non-limiting list collects reference numerals used in the specification.

10 first adapter
12 body
14 first tang or tenon (also, projection)
16 engagement structure (holes)
18 second tang or tenon (also, projection)
20 hole to couple to adapter 40
22 abutment surface
24 mating surface
26 recess (core-out)
28 curved surface
40 second adapter
42 adapter body
44 recess or mortise
45 abutment surface
48 flat surface
50 curved surface
52 curved abutment
53 screw hole or threaded recess
54 front surface
56 screw hole (to couple cover 60)
58 recess (core-out)
60 cover
62 screw hole receiving screw 66
64 screw hole receiving screw 214
66 screw
68 curved profile
200 light bar of prior art
201 light bar of prior art
202 housing
204 light-emitting region
206 end cap
208 mounting bracket (L-bracket)
212 vehicle roof or bumper
214 screws (to end cap 206)
216 bolt hole(s)
218 bolt(s)
220 bolt
222 curved surface of end cap 206
224 screw holes
226 boss around hole 216
Y vertical axis
L Longitudinal axis

What is claimed is:

1. A method for coupling together a plurality of automotive light bars (200; 201), comprising
 attaching a first adapter (10) to a first light bar (200) having a light source (204) and a surface attachment mechanism (208);
 attaching a second adapter (40) to a second light bar (201) having a light source (204) and a surface attachment mechanism (208); and
 coupling the first adapter to the second adapter,
thereby affixing the first light bar (200) to the second light bar (201);
 wherein the light bars have outwardly-facing exterior convex surfaces on respective end caps (206), and
 further providing the first and second adapters with outwardly-facing peripheral curved surfaces (28, 52) that face towards and conform to the outwardly-facing exterior convex surfaces of the respective end caps (206) that the first and second adapters are attached to.

2. The method of claim 1, further comprising
providing the first and second adapters with corresponding outwardly-directed shape features; and
wherein the coupling comprises interfitting the corresponding shape features.

3. The method of claim 2, wherein the providing further comprises forming a projecting tang in the first adapter and a corresponding socket in the second adapter.

4. The method of claim 1, wherein the coupling further comprises defining a mortise and tenon joint between the first and second adapters.

5. The method of claim 1, wherein the coupling comprises irrotationally joining the first and second adapters.

6. The method of claim 1, wherein the attaching the first adapter to the first light bar comprises not attaching the first adapter to the second light bar.

7. The method of claim 1, wherein the coupling the first adapter to the second adapter is performed subsequent to either the attaching the first adapter (10) to the first light bar (200) or the attaching the second adapter (40) to the second light bar (201).

8. The method of claim 7, wherein the coupling the first adapter to the second adapter is performed subsequent both the attaching the first adapter and the second adapter to the respective light bars.

9. The method of claim 1, wherein the light bars have outwardly convex curved end caps (206), and wherein the peripheral curved surfaces of the first and second adapters comprise inwardly concave curved surfaces (28, 50; 52) that conform to the convex end caps (206).

10. The method of claim 1, further comprising
connecting a first mounting bracket (208) at a first lateral end of the first light bar, and a second mounting bracket (208) at a second lateral end of the second light bar most distal from the first lateral end of the first light bar; and
attaching the affixed first and second light bars to a vehicle mount surface (212).

11. The method of claim 10, wherein the connecting the first and second mounting brackets further comprises not connecting any mounting bracket intermediate the opposed lateral ends of the affixed first and second light bars.

12. The method of claim 10, wherein the attaching further comprises connecting the first and second light bars to the vehicle mount surface only at the first and second mounting brackets (208, 208).

13. The method of claim 10, wherein the attaching further comprises the affixed first and second light bars being self-supporting at locations intermediate opposed first and second mounting brackets (208, 208).

14. The method of claim 1, wherein the affixed first and second light bars (200, 201) are unsupported by a mounting bracket (208) at a location intermediate opposed lateral ends of the joined first and second light bars.

15. The method of claim 14, wherein the affixed first and second light bars are self-supporting at a region proximate the first and second adapters.

16. The method of claim 1, wherein the affixed first and second light bars (200, 201) are co-linear.

17. The method of claim 1, further comprising attaching a cover (60) to the coupled first and second adapters, and further securing the cover to at least one of the light bars.

18. The method of claim 1, wherein
the coupling the first adapter to the second adapter is performed subsequent to the attaching the second adapter (40) to the second light bar (201); and
the coupling the first adapter to the second adapter that has been coupled to the second light bar is performed such that the first adapter is spaced from the second light bar.

19. A method for coupling together a plurality of automotive light bars (200; 201), comprising
attaching a first adapter (10) to a first light bar (200) having a light source (204) and a surface attachment mechanism (208);
attaching a second adapter (40) to a second light bar (201) having a light source (204) and a surface attachment mechanism (208); and
coupling the first adapter to the second adapter,
thereby affixing the first light bar (200) to the second light bar (201),
wherein the light bars have outwardly convex curved end caps (206), and further comprising providing the first and second adapters with inwardly concave curved surfaces (28, 50; 52) that conform to the convex end caps (206).

* * * * *